Dec. 6, 1949     H. E. PAGE     2,490,086
ELECTRICALLY OPERATED SHEARS
Filed May 12, 1945
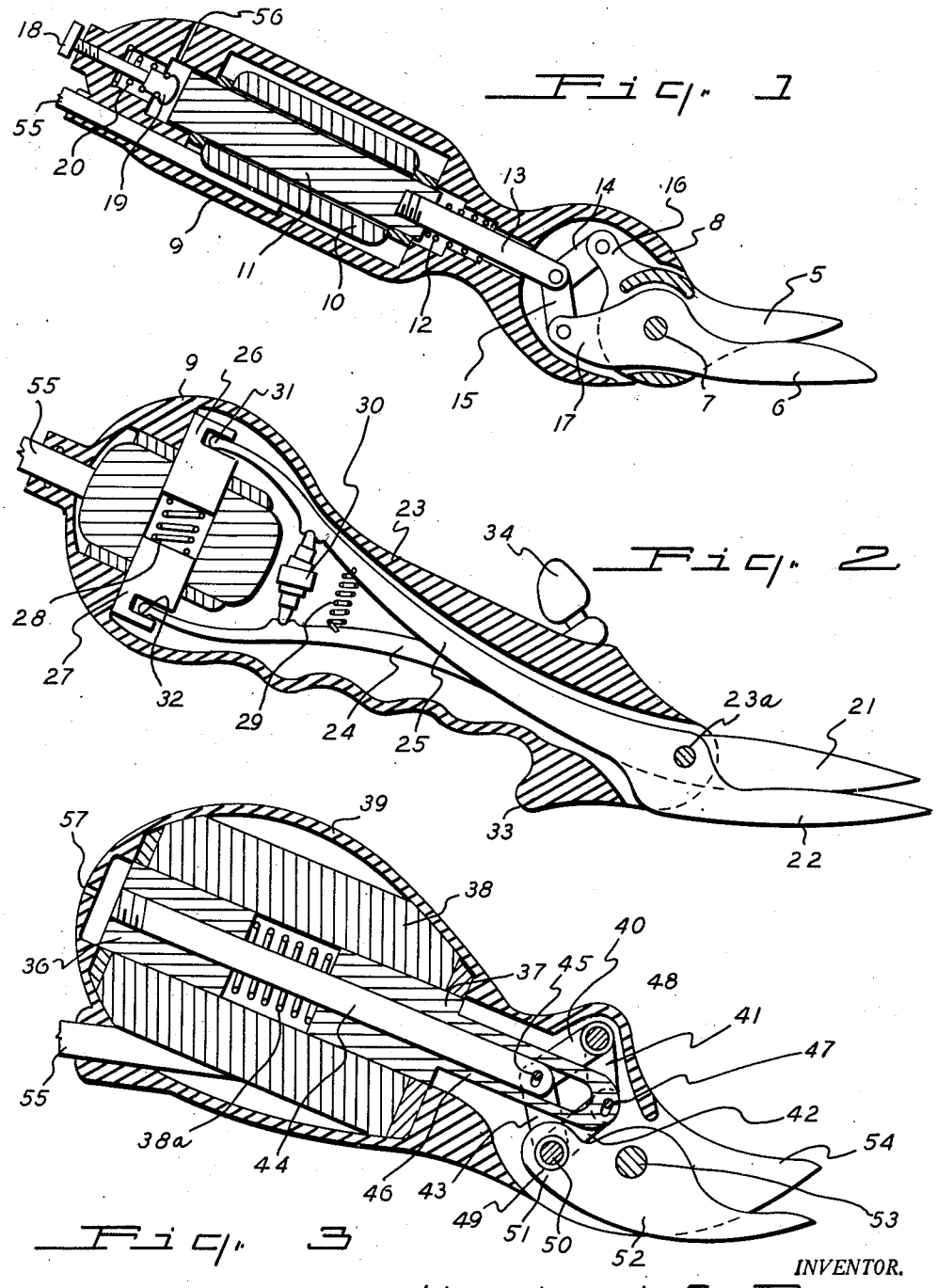
INVENTOR.
Herbert E. Page
BY Mason Graham
Attys.

Patented Dec. 6, 1949

2,490,086

UNITED STATES PATENT OFFICE 2,490,086

ELECTRICALLY OPERATED SHEARS

Herbert E. Page, Alhambra, Calif.

Application May 12, 1945, Serial No. 593,432

5 Claims. (Cl. 30—228)

My invention relates to hand tools particularly of the type operated by swinging movement of a pivoted cutting blade or blades, and more particularly to shears.

Shears are made in a wide variety of forms according to the use for which they are intended, those to be used for cutting fabric or light gauges of sheet metal usually comprising a pair of cutting blades pivoted together and operated by lever pieces formed integral with the blades or secured thereto. Shears intended for heavier duty such as for cutting heavy gauges of metal may be formed with a single cutting blade oscillated about a pivot by a lever, while the other blade is mounted on a handle carrying the pivoted blade, or instead of a second blade the head of the handle may be formed to provide an anvil or bearing supporting the work while the movable blade shears through the work from the opposite side.

The heavy duty type of shears usually have a relatively short cut at each stroke as compared with light duty shears since more power has to be applied to cut through the work.

An object of the invention is to apply efficient yet relatively light means for electrically operating tools such as shears by utilizing the powerful effort exerted by a solenoid core pulled into an intermittently energized coil to oscillate the movable blade or blades of the shears.

A further object of the invention is to provide a power driven hand tool such as shears with all moving parts except the cutting blades mounted in a handle of convenient size to be readily held in the hand of the operator.

A still further object of the invention is to provide a power driven hand tool of the kind described which is fast cutting and with which it is possible to accurately follow irregular lines or contours along which the material being worked on is to be cut.

Yet another object of the invention is to provide an electrically operated hand tool such as shears which may be used with the usual industrial current supply either A. C. or D. C., though when used with the latter type of current a standard type of make and break is utilized.

Still another object of the invention is to provide an electrically operated hand tool, such as shears, which is simple in construction and inexpensive to produce yet rugged and long wearing.

Further features and objects of the invention will appear in the following description taken in conjunction with the accompanying drawings.

The invention is hereinafter disclosed in a variety of preferred embodiments but it is to be understood that the scope of the invention is not in any way limited by this illustrative showing but only as indicated by the scope of the appended claims.

In the drawings: Fig. 1 is a longitudinal section showing one form of my invention;

Fig. 2 is a longitudinal section of a second form of the invention; and

Fig. 3 is a longitudinal section of a further form of the invention.

Referring to Fig. 1, the cutting blades 5 and 6 of the power driven shears are oscillated on a pivot 7 mounted to extend across the head 8 of the shears and arranged to be operated by the displacement of the core or plunger of a solenoid on the intermittent energization of the solenoid by any suitable source of voltage, such as A. C. current of any frequency or D. C. current rendered pulsating by any suitable make and break arrangement. Since such circuits are well known in the art it is not necessary to describe them. The handle 9 is bored out to receive the elongated solenoid winding 10 and the solenoid core or plunger 11 is arranged to pass axially through the solenoid winding and to be held so as to project therefrom out of symmetrical relation to the coil by means of a spring 12 arranged between the end of a bore 13 and the core. It will be understood that on energization of the solenoid the core 11 will be forced into a substantially symmetrical relation in the solenoid winding against the pressure of the spring 12. A rod 13 is screwed into one end of the solenoid core 11 and extends through spring 12 toward the head 8. At its forward end rod 13 is pivoted to a pair of toggle links 14, 15 which in turn are pivotally connected to the projecting arms 16, 17 of a pair of blades 5, 6, pivoted at the front of the handle.

It will be evident that as the solenoid is intermittently energized the movement of the solenoid core will force the arms 16, 17 of the blades apart and therefore bring the cutting edges of the blades into closed relation. On de-energization of the solenoid the spring 12 will return the core to initial position and thereby pull the projecting arms inwardly, effecting the opening of the cutting edges.

A bumper construction is provided at the butt end of the tool and comprises a threaded stem 18 engaging a threaded bore at the end of the handle and carrying at its forward end a bumper head 19 held against leaving the stem in a forward direction but free to slide rearwardly on the stem. A spring 20 is arranged between the end of a bore in the butt of the handle and bears against the bumper head to hold it in forward position. By this arrangement it is possible to adjust the forward position of the bumper head, which acts to absorb the rearward impact of the core on de-energization of the solenoid and also to start moving the core again into the solenoid winding. By proper adjustment of the bumper and strength of the springs a smoothly oscillating arrangement may be obtained.

In the form of the invention shown in Fig. 2, the general arrangement of the cutting blades 21, 22 pivoted in the handle 23 at 23a is similar to that of a pair of scissors in that the lever arms 24, 25 which are formed integrally with the cutting blades of the shears are longer than the latter, thereby providing considerable leverage. A sufficient opening and closing movement of the cutting blades is provided with a relatively small movement of the ends of the lever arms in view of the large number of cutting strokes per minute.

In this form of the invention the lever arms 24, 25 are operated by the inward movement of the two-part core 26, 27 of a solenoid mounted in the handle, the solenoid and core being arranged transversely thereof. The two halves of the core are urged apart by a spring 28 arranged between them but the cores are prevented from moving too far outwardly by means of the tension spring 29 connecting the lever arms.

I prefer also to adjust the inward movement of the lever arms by providing a second spring 30 that will control this movement in the manner desired.

While any suitable form of connection between the ends of the lever arms and the cores may be provided, the connection indicated of ball ends 31 on the lever arms received in undercut recesses 32 in the core end is simple and satisfactory.

In the form of the shears shown in Fig. 2 it will be noted that the forward end of the handle 23 is formed to provide a foot 33 which aids in guiding the cutting blades along the cutting line and to steady the head. An on-off switch 34 is shown at the forward end of the handle and is shaped to facilitate operation by the thumb of the user.

In the form of the invention shown in Fig. 3 a variation of the design shown in Fig. 2 is provided by using a divided core 36, 37 working in a solenoid 38 arranged longitudinally in the handle 39. A spring 38a acts to press the cores outwardly. A lazy tong arrangement of links 40, 41, 42, 43 connects the cutting elements to the two parts of the core. The shears shown are designed to cut heavy material and for this reason a large solenoid 38 is arranged to occupy most of the handle 39. The solenoid core 36 at the butt end of the shears is connected by a rod 44 passing through a bore in the half 37 of the solenoid core at the forward end of the solenoid and this rod is connected to the rear pivotal point 41 of the quadrilateral arrangement of links. The forward half of the solenoid core is provided with a bridge 46 which extends beyond the pivotal connection of the rearward half of the core to the lazy tongs and is connected to the diametrically opposite pivotal point 47 of the links. The links 40, 41 are pivoted together to the head or forward end of the handle at 48 while the remaining pivotal connection 49 of the links 42, 43 is provided the rearward extension by a pin 50 projecting from the end of 51 of the cutting blade 52 of the shears which is pivoted at 53 on the head of the handle. The fixed blade 54 of the shears is secured in any convenient manner to the forward end of the handle.

It is to be understood that any convenient form of on-off switch, not shown, may be provided in a spot convenient for use by the operator, in both Figs. 1 and 3.

Leads for electric current are indicated at 55 in all the figures of the drawings.

In order to equalize the air pressure acting on the butt ends of the solenoids of Figs. 1 and 3, which work in bores not open to the atmosphere, I may provide passages 56 (in Fig. 1) and 57 leading from the outer surface of the handle into the bores.

It will be evident that when the solenoid of the power shears shown in Fig. 3 is energized the two cores 36, 37 will be drawn inwardly against the resistance of spring 38a thereby bringing pivots 42 and 45 closer together and thus increasing the distance between pivots 48 and pin 50, which will cause the cutting blade 52 to swing about pivot 53 and deliver a cutting stroke.

It will be seen that by providing electro-magnetic operating means housed in the handle of hand tools, such as shears, the tool is light enough to be readily used while held in one hand of the operator.

By my invention I greatly increase the ease of operation of tools such as shears since it is easier for the operator to follow irregular lines because of the large number of short length cuts made by the tool, and by relieving him of the need to manually operate the handles of the shears, fatigue is largely reduced.

I claim:

1. An electrically operated hand tool including: a handle; a blade pivoted at one end thereof and having a lever arm extending into the handle; a second pivoted blade cooperating with the first mentioned blade and having a lever arm extending into the handle, the ends of said arms being spaced apart; a solenoid mounted within said handle; a divided core mounted within said solenoid; resilient means normally holding the halves of the core out of their inward position; means connecting one half core to one lever and the other half core to the other lever; resilient means acting to control the movement of said levers from one another; and further resilient means to control the movement of said levers toward one another.

2. An electrically operated hand tool, comprising a handle; a pair of blades pivotally mounted at one end of said handle, each of said blades having a lever arm extending into said handle; a solenoid mounted transversely of said handle and partially between said lever arms; a two-part plunger means in said solenoid; means for yieldably holding the plunger parts outwardly of the inward position they would normally tend to occupy when said solenoid is energized; and interengaging means on said plunger parts and the ends of said lever arms whereby movement of said plunger parts inwardly cause said arms to move inwardly therewith to operate said blades.

3. An electrically operated hand tool, comprising a handle; a pair of blades pivotally mounted at one end of said handle, each of said blades having a lever arm extending into said handle; a solenoid mounted transversely of said handle and partially between said lever arms; a two-part plunger means in said solenoid; means for yieldably holding the plunger parts outwardly of the inward position they would normally tend to occupy when said solenoid is energized; interengaging means on said plunger parts and the ends of said lever arms whereby movement of said plunger parts inwardly causes said arms to move inwardly therewith to operate said blades; and means for yieldably resisting outward movement of said lever arms.

4. An electrically operated hand tool, comprising a handle; a pair of blades pivotally mounted at one end of said handle, each of said blades having a lever arm extending into said handle; a solenoid mounted transversely of said handle and partially between said lever arms; a two-part plunger means in said solenoid; means for yieldably holding the plunger parts outwardly of the inward position they would normally tend to occupy when said solenoid is energized; interengaging means on said plunger parts and the ends of said lever arms whereby movement of said plunger parts inwardly causes said arms to move inwardly therewith to operate said blades; means for yieldably resisting inward movement of said lever arms; and means for yieldably resisting outward movement of said lever arms.

5. An electrically operated hand tool, comprising a handle; a pair of blades pivotally mounted at one end of said handle, each of said blades having a lever arm extending into said handle; a solenoid mounted transversely of said handle and partially between said lever arms; a two-part plunger means in said solenoid; said plunger parts each having a recess adjacent the outer end of the part to accommodate respectively the ends of said lever arms; whereby movement of said plunger parts is effective to move said lever arms; and means for yieldably holding said lever arms and said plunger parts outwardly of the inward position said plunger parts would normally tend to occupy when said solenoid is energized.

HERBERT E. PAGE.

REFERENCES CITED

The following references are of record in the file of this patent:

UNITED STATES PATENTS

| Number | Name | Date |
|---|---|---|
| 899,870 | Joice | Sept. 29, 1908 |
| 1,239,644 | Tuttle | Sept. 11, 1917 |
| 1,383,977 | Bowman | July 5, 1921 |
| 1,680,627 | Mings | Aug. 14, 1928 |
| 1,786,625 | Lindstrom | Dec. 30, 1930 |
| 1,798,756 | Redfield | Mar. 31, 1931 |
| 1,806,555 | Gonsett | May 19, 1931 |
| 1,837,197 | Berman | Dec. 22, 1931 |
| 1,996,813 | Jeppson | Apr. 9, 1935 |
| 2,146,298 | Jensen | Feb. 7, 1939 |
| 2,225,580 | Wiggins | Dec. 17, 1940 |

FOREIGN PATENTS

| Number | Country | Date |
|---|---|---|
| 476,306 | Great Britain | Dec. 3, 1937 |
| 703,564 | France | Feb. 9, 1931 |